United States Patent
Jung et al.

(10) Patent No.: US 9,307,545 B2
(45) Date of Patent: Apr. 5, 2016

(54) METHOD AND APPARATUS FOR TRANSCEIVING CONTROL INFORMATION AND/OR DATA TO/FROM A BASE STATION VIA AN ANCHOR TERMINAL IN A WIRELESS ACCESS SYSTEM SUPPORTING MACHINE-TYPE COMMUNICATION

(75) Inventors: Inuk Jung, Anyang-si (KR); Jin Lee, Anyang-si (KR); Kiseon Ryu, Anyang-si (KR); Giwon Park, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 219 days.

(21) Appl. No.: 13/811,236

(22) PCT Filed: Jul. 22, 2011

(86) PCT No.: PCT/KR2011/005446
§ 371 (c)(1),
(2), (4) Date: Jan. 18, 2013

(87) PCT Pub. No.: WO2012/011786
PCT Pub. Date: Jan. 26, 2012

(65) Prior Publication Data
US 2013/0121296 A1    May 16, 2013

Related U.S. Application Data

(60) Provisional application No. 61/366,947, filed on Jul. 23, 2010.

(51) Int. Cl.
*H04W 72/08*   (2009.01)
*H04W 76/02*   (2009.01)
(Continued)

(52) U.S. Cl.
CPC ........... *H04W 72/085* (2013.01); *H04L 1/0026* (2013.01); *H04L 1/188* (2013.01); *H04L 1/1887* (2013.01); *H04W 76/023* (2013.01); *H04L 2001/0097* (2013.01); *H04W 4/005* (2013.01); *H04W 88/04* (2013.01)

(58) Field of Classification Search
None
See application file for complete search history.

(56) References Cited

U.S. PATENT DOCUMENTS 6,115,390 A * 9/2000 Chuah .......................... 370/443
7,436,801 B1 * 10/2008 Kanterakis ................... 370/329
(Continued)

OTHER PUBLICATIONS

HanGyu Cho et al., "Machine to Machine (M2M) Communication Study Report (Draft)", IEEE 802.16 Broadband Wireless Access Working Group, IEEE 802.16ppc-10/0002r5, May 2010, 14 pages.
(Continued)

*Primary Examiner* — Hassan Kizou
*Assistant Examiner* — Tejis Daya
(74) *Attorney, Agent, or Firm* — Lee, Hong, Degerman, Kang & Waimey (57) ABSTRACT

The present description relates to a method in which a first terminal communicates with a base station via a second terminal in a wireless access system supporting machine-type communication (MTC). The method comprises the following steps: transmitting, to the second terminal, uplink data to be transmitted to the base station; receiving, from the base station, control information corresponding to the quality of a link between the first terminal and the second terminal; and retransmitting the uplink data to the second terminal in accordance with the received control information, wherein the control information includes information on the delay between the second terminal and the base station, and information on the measured quality of the link between the first terminal and the second terminal.

13 Claims, 6 Drawing Sheets

(51) Int. Cl.
*H04L 1/18* (2006.01)
*H04L 1/00* (2006.01)
*H04W 88/04* (2009.01)
*H04W 4/00* (2009.01)

(56) References Cited

U.S. PATENT DOCUMENTS

| | | | |
|---|---|---|---|
| 7,508,792 B2 * | 3/2009 | Petrovic et al. | 370/331 |
| 7,668,504 B2 * | 2/2010 | Kang et al. | 455/11.1 |
| 7,702,289 B2 * | 4/2010 | Tzavidas et al. | 455/69 |
| 7,890,049 B2 * | 2/2011 | Chang et al. | 455/11.1 |
| 7,929,445 B2 * | 4/2011 | Suh et al. | 370/235 |
| 7,933,236 B2 * | 4/2011 | Wang et al. | 370/328 |
| 8,107,394 B2 * | 1/2012 | Kim et al. | 370/252 |
| 8,179,813 B2 * | 5/2012 | Cheng et al. | 370/252 |
| 8,483,116 B2 * | 7/2013 | Chang et al. | 370/315 |
| 8,533,552 B2 * | 9/2013 | Chang et al. | 714/748 |
| 8,570,889 B2 * | 10/2013 | Gan et al. | 370/252 |
| 8,576,753 B2 * | 11/2013 | Senarath et al. | 370/279 |
| 8,619,606 B2 * | 12/2013 | Nagaraja | 370/252 |
| 8,639,997 B2 * | 1/2014 | Damnjanovic et al. | 714/748 |
| 2002/0080736 A1 * | 6/2002 | Furukawa | 370/328 |
| 2007/0081479 A1 * | 4/2007 | Kang et al. | 370/310 |
| 2008/0285499 A1 * | 11/2008 | Zhang et al. | 370/315 |
| 2009/0046650 A1 * | 2/2009 | Dalsgaard et al. | 370/329 |
| 2010/0254287 A1 * | 10/2010 | Sawahashi et al. | 370/280 |
| 2011/0149774 A1 * | 6/2011 | Chen et al. | 370/252 |
| 2013/0064116 A1 * | 3/2013 | Speight et al. | 370/252 |

OTHER PUBLICATIONS

Ronny Kim et al., "Study Report on Hierarchical Networks (Working document)", IEEE 802.16 Broadband Wireless Access Working Group, IEEE 802.16ppc-10/0008, Jul. 2010, 14 pages (See sections 2.1.2 and 3).

Kerstin Johnsson, et al., "Client Cooperation in Future Wireless Broadband Networks", IEEE 802.16 Presentation Submission Template (Rev. 9), IEEE C802.16-10/0005r1, Jan. 2010, 16 pages.

Luis Loyola et al., "Increasing the capacity of IEEE 802.11 Wireless LAN through cooperative coded retransmissions", in: Proceeding of IEEE Vehicular Technology Conference, May 2008, 5 pages (See chapters III and IV).

Johnsson, et al., "Client Cooperation in Future Wireless Broadband Networks," IEEE 802.16 Presentation Submission Template (Rev. 9), IEEE C802.16-10/0005r1, Jan. 2010, 16 pages.

Loyola, et al., "Increasing the capacity of IEEE 802.11 Wireless LAN through cooperative coded retransmissions," IEEE, 2008, 5 pages.

Korean Intellectual Property Office Application Serial No. 10-2013-7002973, Notice of Allowance dated Sep. 18, 2014, 2 pages.

\* cited by examiner

METHOD AND APPARATUS FOR TRANSCEIVING CONTROL INFORMATION AND/OR DATA TO/FROM A BASE STATION VIA AN ANCHOR TERMINAL IN A WIRELESS ACCESS SYSTEM SUPPORTING MACHINE-TYPE COMMUNICATION

CROSS-REFERENCE TO RELATED APPLICATIONS

This application is the National Stage filing under 35 U.S.C. 371 of International Application No. PCT/KR2011/005446, filed on Jul. 22, 2011, which claims the benefit of U.S. Provisional Application Ser. No. 61/366,947, filed on Jul. 23, 2010, the contents of which are all hereby incorporated by reference herein in their entirety.

BACKGROUND OF THE INVENTION

1. Field of the Invention

This disclosure relates to a wireless access system that supports machine-type communication, and in particular, to a method and apparatus for an MTC device to transmit and receive control information and/or data to/from a base station via an anchor device.

2. Related Art

A machine-to-machine (M2M) communication (machine type communication, MTC) is described in brief below.

Machine to machine (M2M) communication as it is means communication between electronic devices. That is, M2M communication means communication between things. In general, M2M communication means wired or wireless communication between electronic devices or communication between a device and a machine which are controlled by human beings, but M2M communication is used to specially denote wireless communication between an electronic device and an electronic device, that is, devices. Furthermore, M2M devices used in a cellular network have lower performance or capability than common terminals.

There are many terminals within a cell, and the terminals may be classified depending on the type, class, service type, etc of the terminal For example, according to an operation type of terminals, the terminals can be divided into a terminal for human type communication (HTC) and machine type communication (MTC). The MTC may include communication between M2M devices. Herein, the HTC implies a signal transmission/reception operation in which signal transmission is determined by human interventions, and the MTC implies an operation in which each device autonomously transmits a signal either periodically or in an event-driven manner without human interventions.

In addition, when machine to machine (M2M) communication (or machine type communication (MTC)) is taken into consideration, the total number of terminals will increase suddenly. M2M devices may have the following features depending on supported service.

1. A large number of terminals within a cell
2. A small amount of data
3. Low transmission frequency (may have periodicity)
4. A limited number of data characteristics
5. Not sensitive to time delay
6. Low mobility or fixed

SUMMARY OF THE INVENTION

When an MTC device loses data during the course of performing data transmission and reception with a base station via an anchor device, the MTC device needs to perform a data re-transmission process. However, in case the MTC device transmits data via an anchor device, no re-transmission process is currently defined.

Because different configurations apply to retransmission between the MTC device and the base station and retransmission between the MTC device and the anchor device due to the number of hops between the anchor device and the base station (for example, retransmission timer, etc.), a process of resetting a retransmission time considering a delay between the anchor device and the base station needs to be defined.

Accordingly, an object of this disclosure is to prevent a failure to retransmission by the MTC device which may be caused by the anchor device by transmitting link quality information between the anchor device and MTC device subordinate to the anchor device and delay information between the anchor device and the base station.

Further, this disclosure aims to reduce overhead occurring upon checking reliability by defining a group response (ACK/NACK) process between the MTC device and the base station.

In an aspect, a method of performing communication between a first device and a base station through a second device in a wireless access system that supports machine-type communication (MTC) is provided. The method includes transmitting to the second device uplink data to be transmitted to the base station, receiving from the base station control information corresponding to quality of a link with the second device, and performing a retransmission process for the uplink data transmitted to the second device based on the received control information. The control information includes delay information between the second device and the base station and link quality measuring information between the first device and the second device.

The first device may be a subordinate device subordinate to the second device, and the second device may be an anchor device that receives control information and/or data from the first device and relays the control information and/or the data to the base station.

The performing the retransmission process may include resetting a retransmission timer for the uplink data transmitted to the second device based on the received control information, and retransmitting the uplink data transmitted to the second device according to the reset retransmission timer.

The retransmitting the uplink data transmitted to the second device may be performed when failing to receive a response to the uplink data transmitted to the second device from the base station or receiving a negative-acknowledgement (NACK) to the uplink data transmitted to the second device from the base station.

The delay information may be a round trip delay (RTD) or a relative delay (RD).

The retransmission timer may be an automatic repeat request (ARQ) timer or a hybrid automatic repeat request (HARQ) timer.

The method may further include the second device transmitting to the base station the uplink data and the link quality measuring information regarding a link with the first device received from the first device.

The method further include requesting a group response to the uplink data transmitted to the second device to the base station through the second device, and receiving the group response from the base station.

The group response may be a group response for a plurality of first devices or a group response for a plurality of protocol data units (PDUs) of the first device.

The group response may be a group acknowledgement (ACK).

The group response may be received from the base station in a broadcast scheme, and the group response may include a PDU sequence number of a data packet received from each first device.

The requesting the group response may include transmitting indication information indicating a group response request for the uplink data transmitted to the second device, and the indication information may be transmitted through a piggyback bit, a media access control (MAC) message or a process of requesting a bandwidth.

The method may further include buffering the uplink data transmitted to the second device, and releasing the buffered uplink data when receiving the group response from the base station.

The method may further include receiving downlink data from the base station, receiving response delay time information indicating a transmission time of a response for delaying the response to the received downlink data from the base station, and transmitting the response to the received downlink to the base station according to the response delay time information.

The response delay time information may be transmitted to the base station through a downlink A-MAP (DL A-MAP) or an MAC message.

The control information may further include transmission power adjustment information for adjusting transmission power transmitted from the first device to the second device.

The link quality measuring information may be a channel quality indicator (CQI) or a received signal strength indicator (RSSI).

In another aspect, a device for performing communication with a base station through an anchor device in a wireless access system that supports machine-type communication is provided. The device includes a wireless communication unit for transmitting and receiving a wireless signal to/from an outside, and a controller connected to the wireless communication unit, wherein the controller is configured for controlling the wireless communication unit for transmitting to the anchor device uplink data to be transmitted to the base station, controlling the wireless communication unit for receiving from the base station control information corresponding to quality of a link with the anchor device, and performing a retransmission process for the uplink data transmitted to the anchor device based on the received control information. The control information includes delay information between the anchor device and the base station and link quality measuring information for the quality of the link with the anchor device.

This disclosure provides an effect of preventing a failure to data retransmission by the MTC device by resetting a retransmission timer of the MTC device considering a delay that occurs due to the number of hops between the anchor device and the base station.

Further, this disclosure provides an effect of reducing data overhead that occurs during reliability check by defining a group response process between the MTC device and the base station, that is, by delaying a response process of the MTC device which is insensitive to a delay.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e.

The UTRA is part of a universal mobile telecommunications system (UMTS).

3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, terminologies used in an M2M system will be summarized in brief (1) Machine-to-machine (M2M) communication: Information exchange executable without human intervention between user devices via a BS or between a server and a device in a core network via a BS.

(2) M2M ASN: An access service network capable of supporting an M2M service.

(3) M2M device: A terminal having (or supporting) an M2M function.

(4) M2M subscriber: A consumer of an M2M service.

(5) M2M server: An entity capable of communicating with an M2M device. The M2M server provides an interface accessible by an M2M subscriber.

(6) M2M feature: A unique feature of an M2M application supported by an M2M ASN. One or more features may be necessary to support the application.

(7) M2M group: A group of M2M devices including common and/or identical M2M subscribers, i.e., sharing one or more features.

M2M Group ID (MGID) and M2M Terminal (Or Device) ID (MDID)

A first identifier for indicating an M2M group to which respective M2M terminals (or M2M devices) belong and a second identifier for identifying the M2M devices belonging to the M2M group are allocated to the M2M devices in a system supporting M2M communication. Herein, the first identifier is an identifier used to identify each M2M group in a cell, and the second identifier is an identifier used to identify each M2M device in a group to which the M2M device belongs. That is, the first identifier can be expressed as an M2M group ID, and the second identifier can be expressed as an M2M device ID.

In addition, the first identifier may be used as a primary M2M terminal ID (or a primary M2M device ID), and the second identifier may be used as a secondary M2M terminal ID (or a secondary M2M device ID). For convenience of explanation, the first identifier is used as the M2M group ID, and the second identifier is used as the M2M device ID.

That is, when initial network entry is performed, an M2M group ID and an M2M device ID to be used for communication with the BS are allocated to the M2M devices by a system supporting M2M communication. Herein, the system supporting M2M communication is the BS or a network entity connected to a network. For example, the network entity may be an M2M server.

Although a 802.16 (particularly, 16 m) system is taken as an example in the following description, the method of the present invention is not limited to the 802.16m system, and thus is apparently applied to a system such as LTE, LTE-A, etc.

Figure 1:
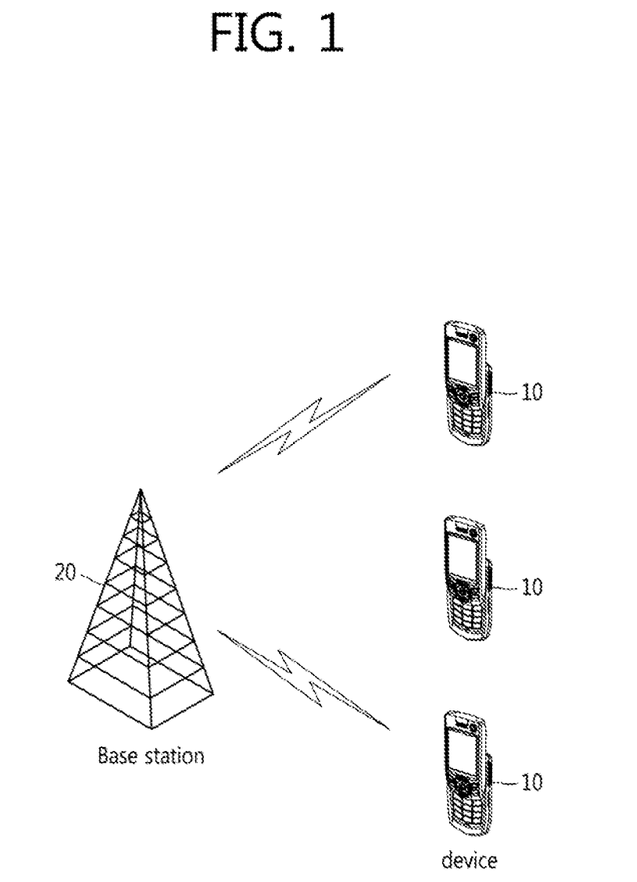
FIG. 1 shows a wireless communication system according to an exemplary embodiment of the present invention.

FIG. 1 shows a wireless communication system according to an exemplary embodiment of the present invention.

The wireless communication system can be widely deployed to provide a variety of communication services, such as voices, packet data, etc.

Referring to FIG. 1, the wireless communication system includes a mobile station (MS) 10 and a base station (BS) 20. The MS 10 may be fixed or mobile, and may be referred to as another terminology, such as a user equipment (UE), a user terminal (UT), a subscriber station (SS), a wireless device, an advanced mobile station (AMS), etc. Further, the MS 10 may be an M2M or MTC device supporting M2M communication. Further, the MS 10 includes both a subordinate device (first device) and an anchor device (second device).

The BS 20 is generally a fixed station that communicates with the MS 10 and may be referred to as another terminology, such as a node-B, a base transceiver system (BTS), an access point, etc. There may be one or more cells within the coverage of the BS 20.

The wireless communication system may be a system based on orthogonal frequency division multiplexing (OFDM)/orthogonal frequency division multiple access (OFDMA).

The OFDM uses a plurality of orthogonal subcarriers. The OFDM uses an orthogonality between inverse fast Fourier transform (IFFT) and fast Fourier transform (FFT). A transmitter transmits data by performing IFFT on the data. A receiver restores original data by performing FFT on a received signal. The transmitter uses IFFT to combine the plurality of subcarriers, and the receiver uses FFT to split the plurality of subcarriers.

In addition, a slot is a minimum possible data allocation unit, and is defined with a time and a subchannel. In an uplink, a plurality of tiles may construct the subchannel. Six tiles may construct the subchannel. In the uplink, three OFDM symbols and one subchannel may construct one burst.

In case of partial usage of subchannels (PUSC) permutation, each tile may include four contiguous subcarriers on three OFDM symbols. Optionally, each tile may include three contiguous subcarriers on three OFDM symbols. A bin includes 9 contiguous subcarriers on an OFDM symbol. A band denotes a group of four rows of the bin. Six contiguous bins construct an adaptive modulation and coding (AMC) subchannel in the same band.

Retransmission and Transmission Power Control

Hereinafter, a retransmission process and a transmission power control process for UL data transmitted by the first device when the first device suggested herein transmits UL information (or signal, control/data) to the base station via the second device are described.

Figure 2A:
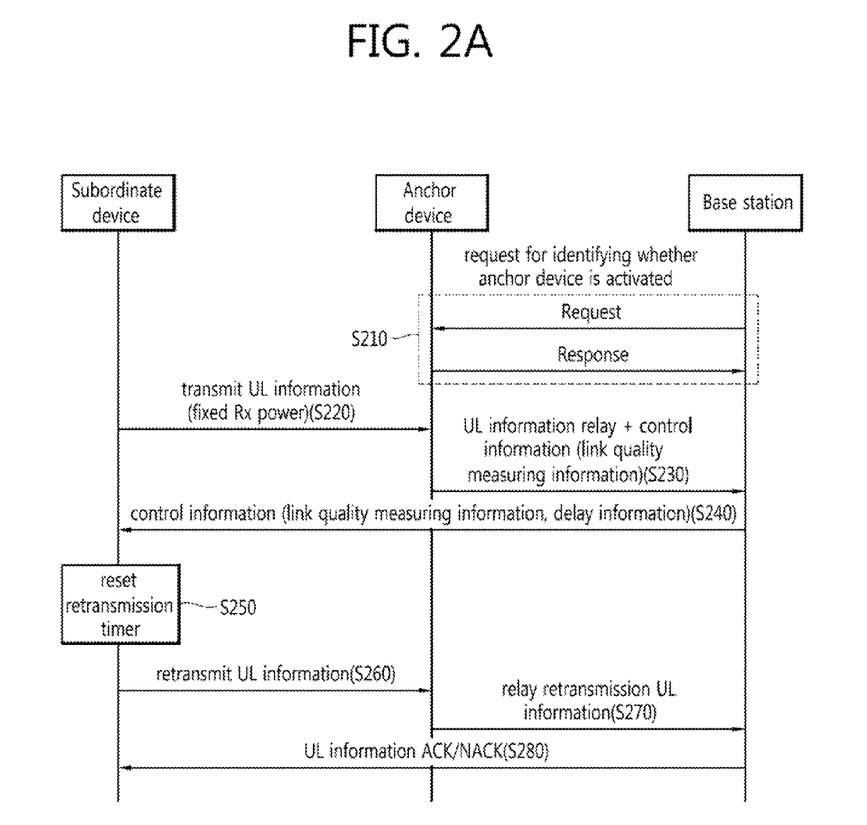
FIGS. 2a and 2b are flowcharts illustrating a retransmission process and a transmission power control process for uplink data transmitted by the first device to the second device according to an embodiment of the present invention.
Figure 2B:
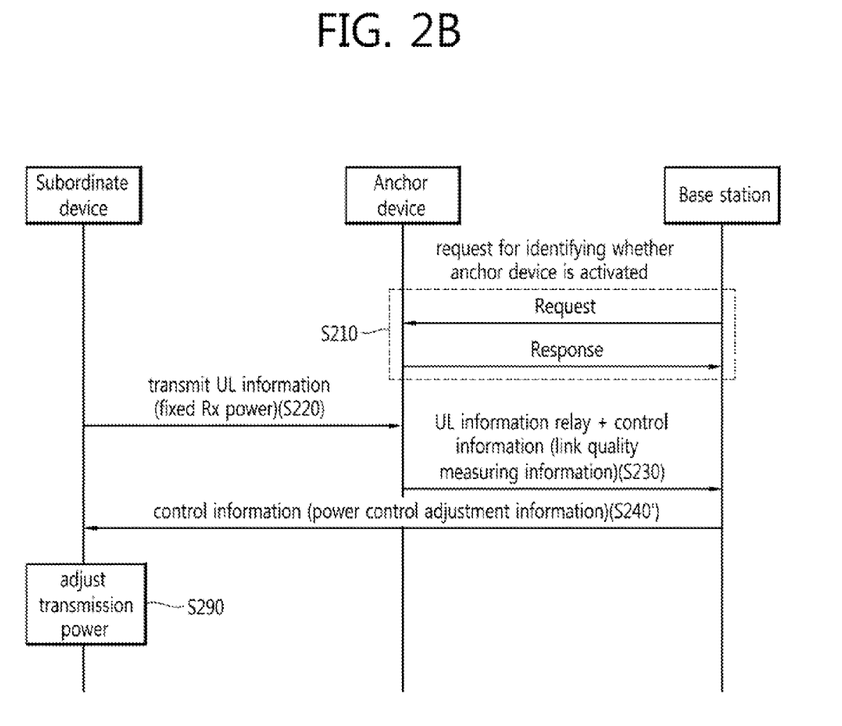

FIGS. 2a and 2b are flowcharts illustrating a retransmission process and a transmission power control process for uplink data transmitted by the first device to the second device according to an embodiment of the present invention. In particular, FIG. 2a illustrates the retransmission process, and FIG. 2b illustrates the transmission power control process.

Here, the first device supports machine-type communication and transmits UL information through the second device to the base station. That is, the first device means a device subordinate to the second device, and for purposes of convenience, may be referred to as a "subordinate device".

Also, the second device is a device that receives information from the first device and relays the information to the base station. The second device may be referred to as a header device, an anchor node or an anchor device. For purposes of convenience, the second device may be referred to as an anchor device.

Subordinate devices are controlled only by the base station, and the anchor device only receives data or control messages from the subordinate device. That is, an information flow occurs only in one direction from the subordinate device to the anchor device. That is, the anchor device simply relays data transmitted by the subordinate device to the base station. In such case, the anchor device does not support provision of reliability for data transmitted by the subordinate device.

Accordingly, reliability for data transmitted by the subordinate devices (as an example, ACK/NACK, ARQ, HARQ) is managed only by the base station. That is, the anchor device does not perform an operation associated with reliability of data received from the subordinate device. The anchor device provides reliability only on information transmitted from the anchor device to the base station or information transmitted from the base station to the anchor device.

First, the anchor device and the base station periodically perform a process of identifying whether the anchor device is activated (S210). That is, the base station transmits a request message for identifying an activation status of the anchor device to the anchor device.

When receiving the request message from the base station, the anchor device transmits a response to the activation status to the base station.

Further, the anchor device performs an advertising process for informing the subordinate devices of the presence of the anchor device at a fixed transmission power so that the subordinate devices may establish a relationship with the anchor device, that is, so that the subordinate devices may participate in the anchor device.

Hereinafter, assume that the anchor device remains activated in the relationship with the base station and the subordinate devices are aware of the presence of the anchor device. That is, assume that the anchor device may receive information for the subordinate devices and may relay the received information to the base station.

Referring to FIG. 2a, the subordinate device transmits uplink (UL) information (control information and/or data) to the anchor device for transmission to the base station (S220). In such case, the subordinate device transmits the UL information to the anchor device at a fixed transmission power.

Thereafter, the anchor device transmits control information including link quality measuring information associated with quality of link with the subordinate device and the UL information received from the subordinate device to the base station (S230). Here, the link quality measuring information may be a channel quality indicator (CQI) or a received signal strength indicator (RSSI).

In other words, the anchor device may transmit the link quality measuring information related with the subordinate device to the base station while relaying the UL information of the subordinate device to the base station.

Then, the base station transmits control information including the link quality measuring information received from the anchor device to the subordinate device (S240).

Here, the control information transmitted from the base station to the subordinate device includes delay information between the anchor device and the base station. Further, the base station may set a proper retransmission timer based on the number of hops between the subordinate device and the base station and may then include the set timer in the control information that is then transmitted to the subordinate device. The retransmission timer may be an automatic repeat request (ARQ) timer or a hybrid automatic repeat request (HARQ) timer.

Further, the delay information may be a round trip delay (RTD) or a relative delay (RD).

Thereafter, the subordinate device may set a retransmission timer for uplink data that is transmitted to the anchor device based on the control information received from the base station (S250).

That is, the subordinate device newly sets a timer for retransmission of UL information by considering a delay element associated with data transmission between the anchor device and the base station. Here, in case the retransmission timer is included in the control information as described above, the process of setting the retransmission timer of the subordinate device may be skipped.

Thereafter, in case the subordinate device fails to receive a response to the uplink data transmitted to the anchor device from the base station or receives a negative acknowledgement (NACK) to the uplink data transmitted to the anchor device from the base station, the subordinate device retransmits uplink data transmitted to the anchor device according to the newly set retransmission timer (S260).

Likewise, the anchor device relays the retransmission data received from the subordinate device to the base station (S270), and the subordinate device receives a response (ACK/NACK) to the data retransmitted from the base station (S280).

Further, referring to FIG. 2b, the control information transmitted from the base station to the subordinate device may further include power control adjustment information (S240'). The power control adjustment information refers to an adjustment value for a fixed transmission power transmitted from the subordinate device to the anchor device.

Accordingly, the subordinate device corrects the existing fixed power value transmitted to the anchor device based on the received power control adjustment information (S290).

Group Response

Figure 3A:
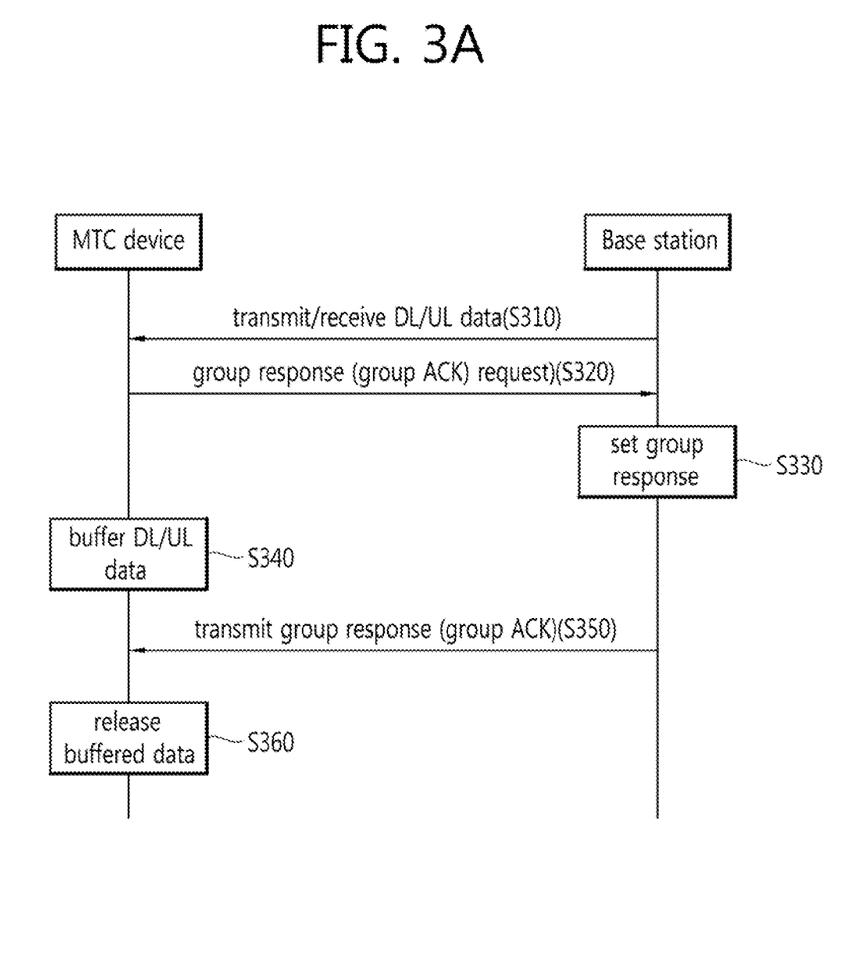
FIGS. 3a and 3b are flowcharts illustrating a group response process according to an embodiment of the present invention.
Figure 3B:
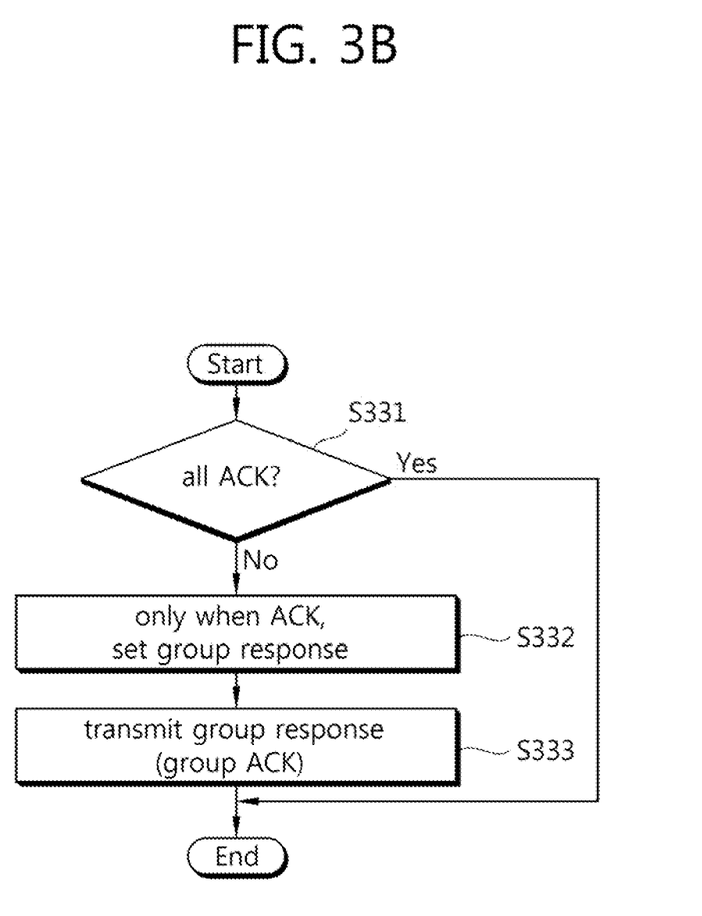

FIGS. 3a and 3b are flowcharts illustrating a group response process according to an embodiment of the present invention.

Although not shown in FIGS. 3a and 3b, it is hereinafter assumed that all types of information transmitted from a subordinate device are transmitted to a base station via an anchor device.

Referring to FIG. 3a, the subordinate device and the base station transmit and receive downlink/uplink (DL/UL) data (S310).

Thereafter, the subordinate device may send a request for a group response (Group ACK) for the DL/UL data transmitted/received between the subordinate device and the base station to the base station (S320). Here, the base station receives the group response request transmitted from the subordinate device via the anchor device. Here, the group response request for the DL data received from the base station may be instructed by the base station.

In case the group response request for the DL data is instructed by the base station, the base station may transmit ACK delay time informing a time that the group response by the subordinate device is transmitted to the subordinate device through DL A-MAP or a separate MAC message.

In such case, the subordinate device buffers the ACK for the DL data received from the base station until the group ACK transmission time.

Further, the group response request may be a group response request for a plurality of protocol data units (PDUs) sent from a single subordinate device to the base station or a group response request sent from the subordinate device to the base station to receiver a response together with a response to other subordinate devices. Here, in case the subordinate device sends a group response request to the base station for purposes of receiving a response together with the response to the other subordinate devices, the base station may transmit a group response to the subordinate devices to receive the group response in a broadcast scheme.

Further, in case the group response request is a group response request for a plurality of PDUs, the base station may include the PDU sequence number of the received data packet in the group response and may then transmit the group response to the corresponding device.

Further, the group response request may be transmitted to the base station through a piggyback bit, an MAC message, or a process of requesting a bandwidth.

Then, when receiving a group response from the subordinate device, the base station sets the group response (S330).

Here, as shown in FIG. 3b, in case all the responses to the subordinate devices are not ACK, the base station sets a group response only to the ACK responses (S331 and S332) and may transmit the group response only the subordinate devices receiving the ACK response in a broadcast scheme (S333). In such case, the base station may transmit a response to each of the subordinate devices receiving the NACK response, that is, may transmit the response in a unicast scheme.

The subordinate device which sent a group response request to the base station buffers the data until receiving the group response from the base station (S340). Thereafter, when receiving the group response from the base station, the subordinate device releases the buffered data (S350 and S360).

The embodiments and modifications described above may be combined with one another. Accordingly, each embodiment may be made alone or in combination, as necessary. Such combination may be easily made by those skilled in the art, and thus, the detailed description thereof is skipped. Although no further description is provided, such combinations are not excluded from the present invention, and should be construed as included in the present invention.

The above-described embodiments and modifications may be made by various means, for example, in hardware, firmware, software, or in a combination thereof When implemented in hardware, the methods according to the embodiments of the present invention may be embodied by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

When implemented in firmware or software, the methods according to the embodiments of the present invention may be embodied in modules, procedures or functions that perform the above-described functions or operations. The software codes may be stored in a memory unit and driven by a processor. The memory unit may be positioned in or outside of the processor and may transmit or receive data to/from the processor by various known means.

For example, the methods according to the embodiments of the present invention may be stored in a storage medium (for example, an internal memory, a flash memory, a hard disk, etc.) and may be implemented as codes or commands in a software program that may be executed by a processor (for example, a microprocessor). This will be described with reference to FIG. 4.

Figure 4:
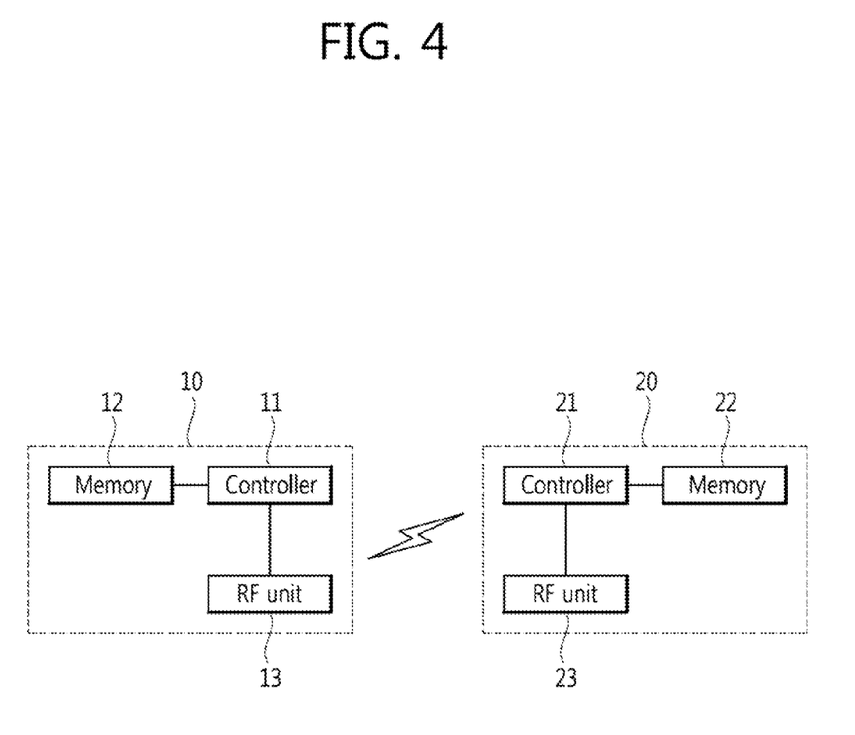
FIG. 4 is a block diagram showing internal structures of an MS and a BS in a wireless access system according to an embodiment of the present invention.

FIG. 4 is a block diagram showing internal structures of an MS and a BS in a wireless access system according to an embodiment of the present invention.

An MS 10 includes a controller 11, a memory 12, and a radio frequency (RF) unit 13.

Further, the MS also includes a display unit, a user interface unit, etc.

The controller 11 implements the proposed functions, procedures, and/or methods. Layers of a wireless interface protocol may be implemented by the controller 11.

The memory 12 is coupled to the controller 11, and stores a protocol or parameter for performing wireless communication. That is, the memory 12 stores an operating system of the MS, an application, and a general file.

The RF unit 13 is coupled to the controller 11, and transmits and/or receives an RF signal.

In addition, the display unit displays a variety of information of the MS, and may be a well-known element such as liquid crystal display (LCD), organic light emitting diodes (OLED), etc. The user interface unit may be constructed by combining well-known user interfaces such as a keypad, a touch screen, etc.

A BS 20 includes a controller 21, a memory 22, and an RF unit 23.

The controller 21 implements the proposed functions, procedures, and/or methods. Layers of a wireless interface protocol may be implemented by the controller 21.

The memory 22 is coupled to the controller 21, and stores a protocol or parameter for performing wireless communication.

The RF unit 23 is coupled to the controller 21, and transmits and/or receives an RF signal.

The controllers 11 and 21 may include an application-specific integrated circuit (ASIC), a separate chipset, a logic circuit, and/or a data processing unit. The memories 12 and 22 may include a read-only memory (ROM), a random access memory (RAM), a flash memory, a memory card, a storage medium, and/or other equivalent storage devices. The RF units 13 and 23 may include a baseband circuit for processing an RF signal. When the embodiment of the present invention is implemented in software, the aforementioned methods can be implemented with a module (i.e., process, function, etc.) for performing the aforementioned functions. The module may be stored in the memories 12 and 22 and may be performed by the controllers 11 and 21.

The memories 12 and 22 may be located inside or outside the controllers 11 and 21, and may be coupled to the controllers 11 and 21 by using various well-known means.

In addition, the terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms are intended to include the plural forms as well, unless the context clearly indicates otherwise. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

It will be understood that although the terms "first" and "second" are used herein to describe various elements, these elements should not be limited by these terms. These terms are only used to distinguish one element from another element. For example, a first component may be termed a second component, and similarly, a second component may be termed a first component without departing from the scope of the present invention.

When a component is mentioned as being "connected" to or "accessing" another component, this may mean that it is directly connected to or accessing the other component, but it is to be understood that there are no intervening components present. On the other hand, when a component is mentioned as being "directly connected" to or "directly accessing" another component, it is to be understood that there are no intervening components present.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparently understandable that claims failing to be explicitly cited in the appended claims are combined to construct new embodiments or can be included as new claims by amendment after filing the application.

What is claimed is:

1. A method of performing subordinate communication between with a base station and through an anchor device in a wireless access system that supports machine-type communication (MTC), the method performed by a subordinate device and comprising:

receiving, by the subordinate device directly from the anchor device, an advertisement message for advertising a presence of the anchor device, wherein the advertisement message for advertising a presence of the anchor device is transmitted at a predetermined power from the anchor device to the subordinate device after the anchor device has received an activation request message from the base station and established a relationship with the base station based on the activation request message;

transmitting, by the subordinate device to the anchor device, uplink data to be transmitted to the base station when the subordinate device determines to be relayed by the anchor device based on the advertisement message;

transmitting, from the subordinate device to the base station, a group request message for requesting the base station to group response messages for a plurality of subordinate devices;

buffering the uplink data transmitted to the anchor device;

receiving, by the subordinate device directly from the base station without any intervention of the anchor device, control information;

performing, by the subordinate device, a retransmission process for the uplink data transmitted to the anchor device based on the control information directly received from the base station without any intervention of the anchor device; and releasing the buffered uplink data if a group response including the response messages for the plurality of subordinate devices is received from the base station and if one among the response messages for the plurality of subordinate devices in the group response message corresponds to a response message with respect to the uplink data transmitted from the subordinate device, wherein the control information received directly from the base station without any intervention of the anchor device includes all of delay information between the anchor device and the base station and link quality measuring information between the subordinate device and the anchor device, and wherein the control information received directly from the base station without any intervention of the anchor device further includes transmission power adjustment information for adjusting transmission power transmitted from the subordinate device to the anchor device.

2. The method of claim 1, wherein the performing the retransmission process comprising:

resetting a retransmission timer for the uplink data transmitted to the anchor device based on the received control information; and retransmitting the uplink data transmitted to the anchor device according to the reset retransmission timer.

3. The method of claim 1, wherein the retransmitting the uplink data transmitted to the anchor device is performed when failing to receive the response message with respect to the uplink data transmitted to the anchor device from the base station or receiving a negative-acknowledgement (NACK) to the uplink data transmitted to the anchor device from the base station.

4. The method of claim 1, wherein the delay information is a round trip delay (RTD) or a relative delay (RD).

5. The method of claim 2, wherein the retransmission timer is an automatic repeat request (ARQ) timer or a hybrid automatic repeat request (HARD) timer.

6. The method of claim 1, further comprising transmitting from the anchor device to the base station the uplink data and the link quality measuring information regarding a link with the subordinate device received from the subordinate device.

7. The method of claim 1, wherein the group response is a group acknowledgement (ACK).

8. The method of claim 1,
wherein the group response is received from the base station in a broadcast scheme, and wherein the group response includes a PDU sequence number of a data packet received from each subordinate device.

9. The method of claim 1,
wherein the group request message is transmitted through a piggyback bit, a media access control (MAC) message or a process of requesting a bandwidth.

10. The method of claim 1, further comprising:
receiving downlink data from the base station;
receiving response delay time information indicating a transmission time of a response for delaying the response to the received downlink data from the base station; and
transmitting the response to the received downlink to the base station according to the response delay time information.

11. The method of claim 10, wherein the response delay time information is transmitted to the base station through a downlink A-MAP (DL A-MAP) or an MAC message.

12. The method of claim 1, wherein the link quality measuring information is a channel quality indicator (CQI) or a received signal strength indicator (RSSI).

13. A subordinate device for performing communication with a base station through an anchor device in a wireless access system that supports machine-type communication, the device comprising:

a wireless communication unit for transmitting and receiving a wireless signal to/from an outside; and a controller connected to the wireless communication unit, wherein the controller is configured to:

receive, directly from the anchor device, an advertisement message for advertising a presence of the anchor device, wherein the advertisement message for advertising a presence of the anchor device is transmitted at a predetermined power from the anchor device to the subordinate device after the anchor device has received an activation request message from the base station and established a relationship with the base station based on the activation request message;

transmit, to the anchor device, uplink data to be transmitted to the base station when the subordinate device determines to be relayed by the anchor device based on the advertisement message;

transmit, from the subordinate device to the base station, a group request message for requesting the base station to group response messages for a plurality of subordinate devices;

buffer the uplink data transmitted to the anchor device;

receive, directly from the base station without any intervention of the anchor device, control information;

perform a retransmission process for the uplink data transmitted to the anchor device based on the control information directly received from the base station without any intervention of the anchor device; and release the buffered uplink data if a group response including the response messages for the plurality of subordinate devices is received from the base station and if one among the response messages for the plurality of subordinate devices in the group response message corresponds to a response message with respect to the uplink data transmitted from the subordinate device, wherein the control information received directly from the base station without any intervention of the anchor device includes all of delay information between the anchor device and the base station and link quality measuring information between the subordinate device and the anchor device, and wherein the control information received directly from the base station without any intervention of the anchor device further includes transmission power adjustment information for adjusting transmission power transmitted from the subordinate device to the anchor device.

\* \* \* \* \*